US012801294B2

(12) United States Patent
Nandu et al.

(10) Patent No.: US 12,801,294 B2
(45) Date of Patent: Nov. 17, 2026

(54) ACTIVITY-BASED DATA RANDOM ACCESS MEMORY (RAM) RETENTION

(71) Applicant: QUALCOMM Incorporated, San Diego, CA (US)

(72) Inventors: Hiral Nandu, South San Francisco, CA (US); Subbarao Palacharla, San Diego, CA (US); Vinod Mohan George, Bangalore (IN); Tarun Solanki, Bhopal (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/933,835

(22) Filed: Oct. 31, 2024

(65) Prior Publication Data

US 2026/0119056 A1 Apr. 30, 2026

(51) Int. Cl.
*G06F 3/06* (2006.01)
*G06F 12/0802* (2016.01)

(52) U.S. Cl.
CPC .......... *G06F 3/0625* (2013.01); *G06F 3/0634* (2013.01); *G06F 3/0673* (2013.01); *G06F 12/0802* (2013.01)

(58) Field of Classification Search
CPC ........ G06F 3/06; G06F 3/0625; G06F 3/0634; G06F 3/0673; G06F 12/0802; G06F 12/02; G06F 12/0895; G06F 12/08; G06F 1/3275; G06F 1/3225
See application file for complete search history.

(56) References Cited

U.S. PATENT DOCUMENTS 7,934,054 B1 * 4/2011 Moll ..................... G06F 1/3225 345/541
8,725,953 B2 * 5/2014 Paver .................. G06F 12/0891 711/146
10,579,528 B2 * 3/2020 Hwang ................. G06F 12/084
10,592,165 B1 * 3/2020 Han ...................... G06F 3/0613
11,775,043 B2 * 10/2023 Viswanathan ........ G06F 1/3206 713/320
2007/0050504 A1 * 3/2007 Gomez ................... G06F 3/067 709/226
2011/0117962 A1 * 5/2011 Qiu ....................... H04W 48/18 455/558

(Continued)

FOREIGN PATENT DOCUMENTS

EP 4339788 A1 3/2024
WO 2007024435 A2 3/2007

OTHER PUBLICATIONS

Ye-Jyun Lin, C.-L. Yang, Jiao-Wei Huang and Naehyuck Chang, "Memory access aware power gating for MPSoCs," 17th Asia and South Pacific Design Automation Conference, Sydney, NSW, Australia, 2012, pp. 121-126.*

(Continued)

*Primary Examiner* — Pierre Michel Bataille
(74) *Attorney, Agent, or Firm* — Seyfarth Shaw LLP

(57) ABSTRACT

A processor-implemented method for activity-based data random access memory (RAM) retention includes receiving an activity metric for a portion of at least one memory. The at least one memory includes a cache memory. The portion of the cache memory is controlled by a hardware logic to enter a sleep retention state based on the activity metric for the portion of the cache memory.

11 Claims, 9 Drawing Sheets

(56) References Cited

U.S. PATENT DOCUMENTS

| | | | | |
|---|---|---|---|---|
| 2011/0161705 | A1* | 6/2011 | Vash | G06F 1/3293 713/323 |
| 2012/0173907 | A1 | 7/2012 | Moses et al. | |
| 2013/0191839 | A1* | 7/2013 | Ishikawa | G06F 9/5033 718/104 |
| 2015/0067361 | A1* | 3/2015 | Rusu | G06F 1/3275 713/320 |
| 2016/0092363 | A1* | 3/2016 | Wang | G06F 1/3206 711/119 |
| 2016/0116972 | A1* | 4/2016 | Shin | G06F 3/0625 711/162 |
| 2017/0010655 | A1* | 1/2017 | Kanchana | G06F 1/3275 |
| 2019/0042479 | A1* | 2/2019 | Basak | G06F 21/52 |
| 2021/0026651 | A1* | 1/2021 | Bachmutsky | G06F 9/485 |
| 2023/0315188 | A1* | 10/2023 | Branover | G06F 1/3234 713/323 |
| 2025/0036293 | A1* | 1/2025 | Hahn | G06F 3/0634 |
| 2025/0055994 | A1* | 2/2025 | Naser | H04N 19/14 |
| 2025/0378866 | A1* | 12/2025 | Nagendrakumar | G11C 11/40603 |
| 2026/0161572 | A1* | 6/2026 | Nandu | G06F 12/126 |

OTHER PUBLICATIONS

V. Govindaraj, S. George, M. Kandemir, J. Sampson and V. Naryanan, “PowerPrep: A power management proposal for user-facing data-center workloads,” 2021 IEEE International Conference on Networking, Architecture and Storage (NAS), Riverside, CA, USA, 2021, pp. 1-7.*

R. Wada and N. Yamasaki, “Fast Interrupt Handling Scheme by Using Interrupt Wake-Up Mechanism,” 2019 Seventh International Symposium on Computing and Networking Workshops (CANDARW), Nagasaki, Japan, 2019, pp. 109-114.*

International Search Report and Written Opinion—PCT/US2025/047590—ISA/EPO—Dec. 18, 2025.

Zhou H., et al., “Adaptive Mode Control: A Static-Power-Efficient Cache Design”, ACM Transactions on Embedded Computing Systems, ACM, New York, NY, US, vol. 2, No. 3, Aug. 1, 2003, pp. 347-372, XP058214598, p. 347-p. 351.

* cited by examiner

ACTIVITY-BASED DATA RANDOM ACCESS MEMORY (RAM) RETENTION

BACKGROUND

Field

Aspects of the present disclosure relate to computing devices, and more specifically to activity-based data random access memory (RAM) retention.

Background

Mobile or portable computing devices include mobile phones, laptop, palmtop and tablet computers, portable digital assistants (PDAs), portable game consoles, and other portable electronic devices. Mobile computing devices are comprised of many electrical components that consume power and generate heat. The components (or compute devices) may include system-on-a-chip (SoC) devices, graphics processing unit (GPU) devices, neural processing unit (NPU) devices, digital signal processors (DSPs), and modems, among others.

Cache memories may be employed to boost the performance of computing devices by reducing access time to certain data relative to storing the data in slower storage such as main memory. Large cache memories (e.g., 20 megabytes (MB) or 40 MB) may be employed in various applications to meet power targets for mobile computing devices, which may have limited power and computing resources. However, as the size of the cache memories increase, the memory leakage power may increase, resulting in a significant portion of power being consumed in operating the cache memories. As such, using cache memory in such resource limited compute devices may be challenging.

SUMMARY

Various aspects of the present disclosure are directed to an apparatus. The apparatus has at least one memory and hardware logic coupled to the at least one memory. The hardware logic is configured to receive an activity metric for a portion of at least one memory. The at least one memory comprises a cache memory. The hardware logic is also configured to control the portion of the cache memory to enter a sleep retention state based on the activity metric for the portion of the cache memory.

In various aspects of the present disclosure, a processor-implemented method includes receiving an activity metric for a portion of at least one memory. The at least one memory includes a cache memory. The processor-implemented method further includes controlling the portion of the cache memory to enter a sleep retention state based on the activity metric for the portion of the cache memory.

Various aspects of the present disclosure are directed to an apparatus. The apparatus includes means for receiving an activity metric for a portion of at least one memory. The at least one memory comprises a cache memory. The apparatus further includes means for controlling the portion of the cache memory to enter a sleep retention state based on the activity metric for the portion of the cache memory.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
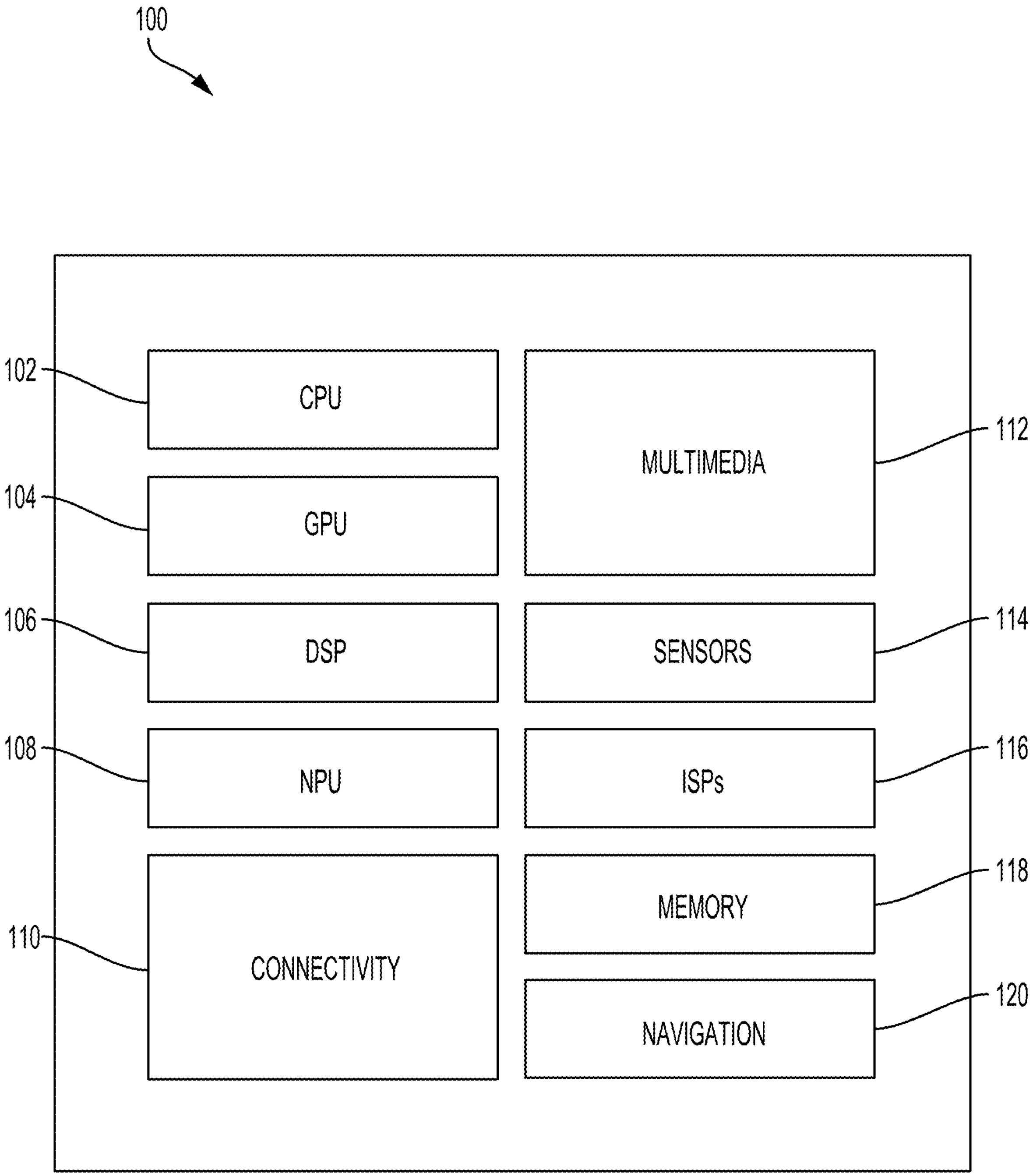
FIG. 1 illustrates an example implementation of a host system-on-a-chip (SoC), in accordance with certain aspects of the present disclosure.

The detailed description set forth below, in connection with the appended drawings, is intended as a description of various configurations and is not intended to represent the only configurations in which the concepts described may be practiced.

The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described, the use of the term “and/or” is intended to represent an “inclusive OR,” and the use of the term “or” is intended to represent an “exclusive OR.” As described, the term “exemplary” used throughout this description means "serving as an example, instance, or illustration," and should not necessarily be construed as preferred or advantageous over other exemplary configurations. As described, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described, the term "proximate" used throughout this description means "adjacent, very near, next to, or close to." As described, the term "on" used throughout this description means "directly on" in some configurations, and "indirectly on" in other configurations.

Mobile or portable computing devices include mobile phones, laptop, palmtop, and tablet computers, portable digital assistants (PDAs), portable game consoles, and other portable electronic devices. Mobile computing devices are comprised of many electrical components that consume power and generate heat. The components (or compute devices) may include system-on-a-chip (SoC) devices, graphics processing unit (GPU) devices, neural processing unit (NPU) devices, digital signal processors (DSPs), and modems, among others.

Cache memories may be employed to boost the performance of computing systems by reducing access time to certain data relative to storing the data in slower storage such as main memory. Cache memories may be built using static random access memory (SRAM) cells. SRAM cells may experience SRAM leakage power.

SRAM leakage power refers to the power consumed by the SRAM cells even when the memory cells are not actively being accessed. The SRAM leakage power may be due to small currents that flow through the transistors in the SRAM cells, even when they are in a standby state.

Large system caches (e.g., 20 megabytes (MB) or more) may be used for some applications including (but not limited to) augmented reality SoCs due to stringent power targets. As cache size increases, the SRAM leakage power may also increase. In some conventional systems, the SRAM power leakage may account for as much as sixteen percent of the total use case power.

Accordingly, to address the SRAM leakage power and other issues, aspects of the present disclosure are directed to activity-based data RAM retention. In various aspects, system cache may be partitioned into power collapsible blocks (PCBs) (e.g., 64 KB blocks). The activity for each PCB may be tracked and inactive PCBs may be placed in a sleep retention state. The PCB may wake up in response to an access to the PCB.

Particular aspects of the subject matter described in this disclosure can be implemented to realize one or more of the following potential advantages. In some examples, the described techniques (e.g., controlling the portion of the cache memory to enter a sleep retention state responsive to the idle counter being greater than a predefined threshold) may reduce the SRAM leakage power as well as the thermal and power dissipation of a mobile device (e.g., a smartphone or extended reality (XR) device).

FIG. 1 illustrates an example implementation of a host system-on-a-chip (SoC) 100, which includes a controller for activity-based data RAM retention in accordance with various aspects of the present disclosure. The host SoC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, universal serial bus (USB) connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU) 108. The host SoC 100 may also include a sensor processor 114, image signal processors (ISPs) 116, a navigation module 120, which may include a global positioning system (GPS), and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set.

Figure 2:
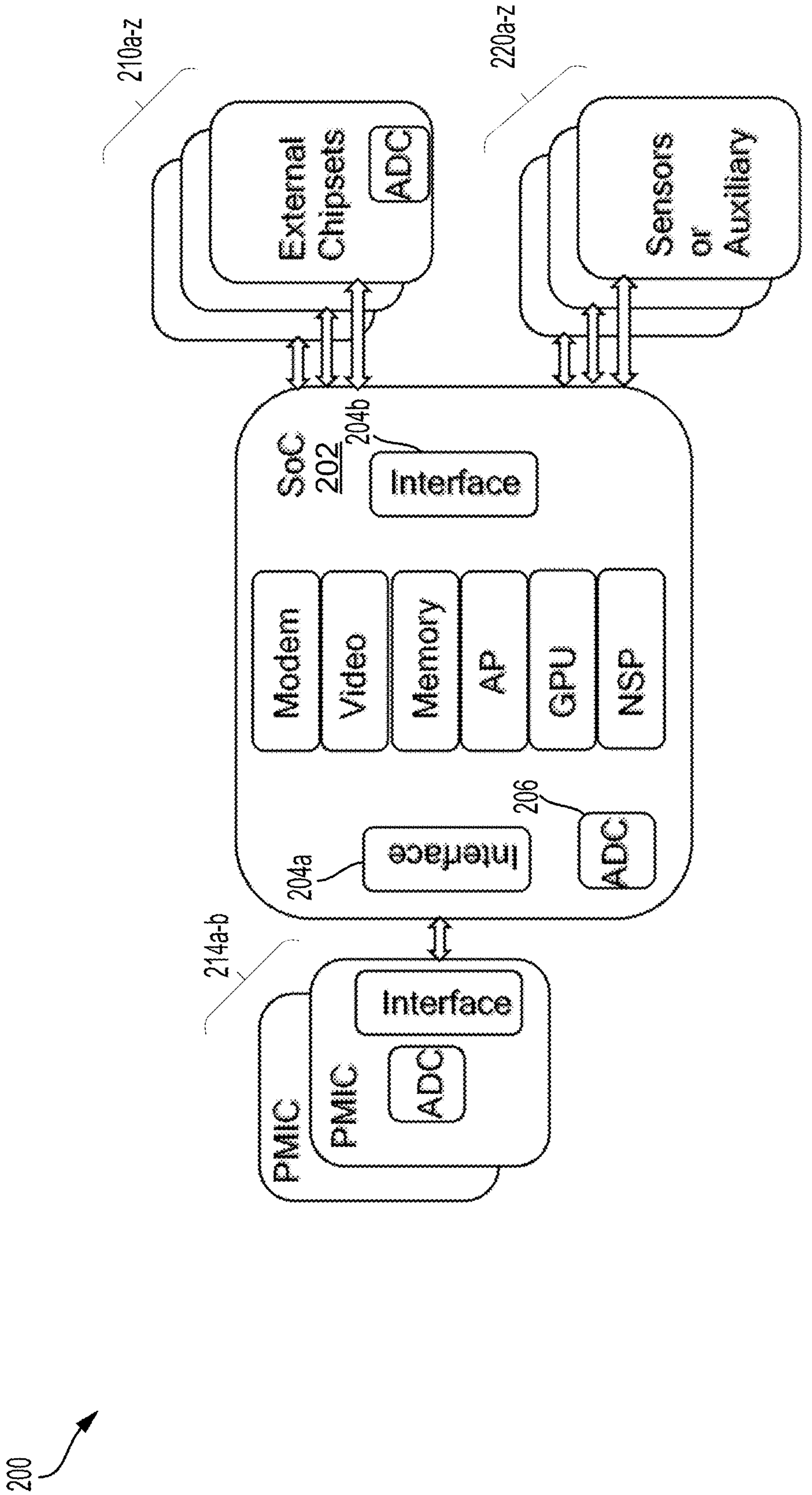
FIG. 2 is a block diagram illustrating an example computing system, in accordance with various aspects of the present disclosure.

FIG. 2 is a block diagram illustrating an example computing system 200, in accordance with various aspects of the present disclosure. As shown in FIG. 2, the example computing system 200 may include a host SoC 202. The host SoC 202 may include similar components and function similar to SoC 100 (FIGURE). As shown in FIG. 2, the host SoC 202 includes interface circuitry 204*a-b* and an ADC 206.

The interface circuitry 204*a-b* may provide connectivity to one or more power management integrated circuits (PMICs) 214*a-b*. In addition, the interface circuitry may provide connectivity to one or more external chipsets 210*a-z* as well as external sensors or auxiliary integrated circuit devices 220*a-z*. In some aspects, the external chipsets 210*a-z* may for example include additional processors, such as one or more external GPUs 210 or one or more wireless communication devices that may facilitate communication such as 5G, 6G, vehicle-to everything communication (V2X), wireless local area network (WLAN), and the like. Moreover, in various aspects, the external chipsets 210*a-z* may, for example, relate to vehicle control and safety systems.

The sensors/auxiliary IC devices 220*a-z* may comprise power sensors (e.g., digital power meters), thermal sensors, current sensors, voltage sensors, and/or transmit power level sensors.

The host SoC 202 may include a single ADC 206. The ADC 206 may periodically sample and monitor mixed signal such as internal on-chip current sensor and voltage sensor outputs. Additionally, the ADC 206 may periodically sample and monitor off-chip parameters such as sensor output parameters associated with the sensors/auxiliary IC devices 220*a-z*. In an example, the ADC 206 may receive an analog voltage signal (e.g., through the interface circuitry 204*a*) from a power supply (e.g., PMIC 214*a-b*), for example. The ADC 206 may digitally encode the analog signal to convert the analog voltage signal to a digital output. The ADC 206 may include both analog and digital circuits and thus, may be considered a mixed-signal integrated circuit. In some aspects, the ADC 206 may also convert other analog signal supplied to the computing system 200 to a digital output. For instance, the ADC 206 may convert analog signals from sensors (e.g., 114 of FIG. 1 or sensors/auxiliary IC devices 220*a-z*) such as temperature sensors, light sensors, sonar signal, video signals, gyroscope sensors and the like.

In some aspects, the ADC 206 may distribute the digital output to digital components of the computing system 200 using a bus transfer protocol such as the advanced micro-controller bus architecture (AMBA) advanced high-performance bus (AHB) protocol, for example.

Figure 3:
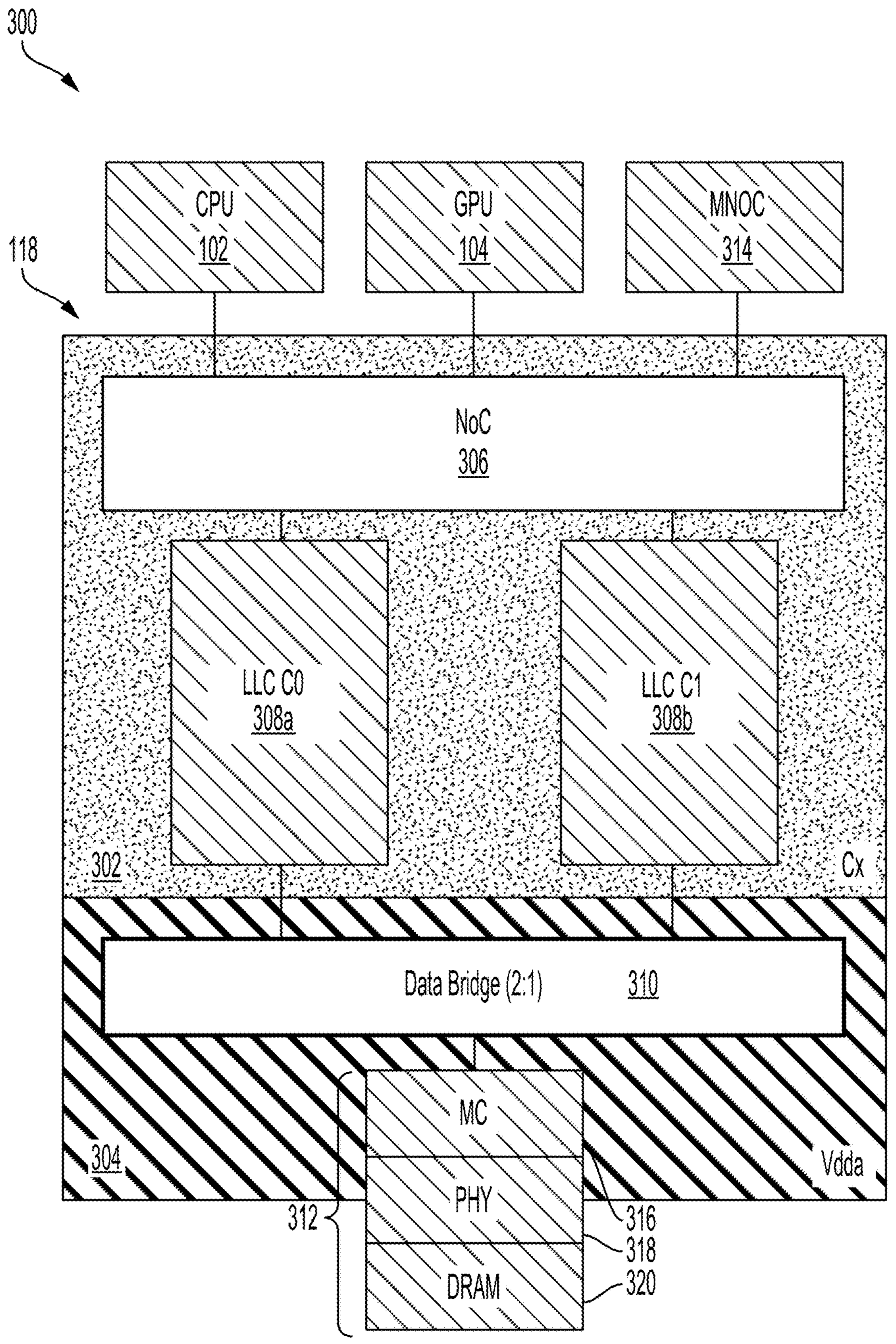
FIG. 3 is a block diagram illustrating an example architecture of memory, in accordance with various aspects of the present disclosure.

FIG. 3 is a block diagram illustrating an example architecture 300 of the memory 118 of the SoC 100 shown in FIG. 1, in accordance with various aspects of the present disclosure. Referring to FIG. 3, the example architecture 300 may be configured with multiple power domains such as a cache domain 302 and a main memory domain 304. In the cache domain 302, the example architecture 300 may include a first network-on-a-chip (NoC) 306 and cache memories (e.g., last level caches) LLC C0 (308*a*) and LLC C1 (308*b*). The first NoC 306 may comprise a communication subsystem for the SoC (e.g., 100) that facilitates data transfers between the components of the SoC. For example, the first NoC 306 may facilitate data transfers between processors such as the CPU 102 and the GPU 104 and/or a multimedia NoC 314 and the cache memories 308*a*, 308*b*.

In the main memory domain 304, the example architecture 300 may include a data bridge 310 and a main memory 312. The main memory 312 may include a memory controller (MC) 316, dynamic random-access memory (DRAM) 320 and a physical layer (PHY) 320, which may serve as a physical interface between the MC 316 and the memory modules of the DRAM 320.

The data bridge 310 (e.g., Northbridge) may serve as an interface between the cache memories 308*a* and 308*b* and the main memory. The MC 316 may manage the flow of data (e.g., reading data, writing data, or refreshing DRAM cells) between main memory 312 and the cache memory (e.g., 308*a* or 308*b*).

The data bridge 310 and MC 316 may be included in the main memory power domain 304 and receive an external analog power supply voltage (Vdda). On the other hand, the cache memories 308*a*, 308*b* may reside in the cache power domain 302 and may receive a second power supply voltage (Cx), which may, for example, be configured via the ADC 206.

Figure 4:
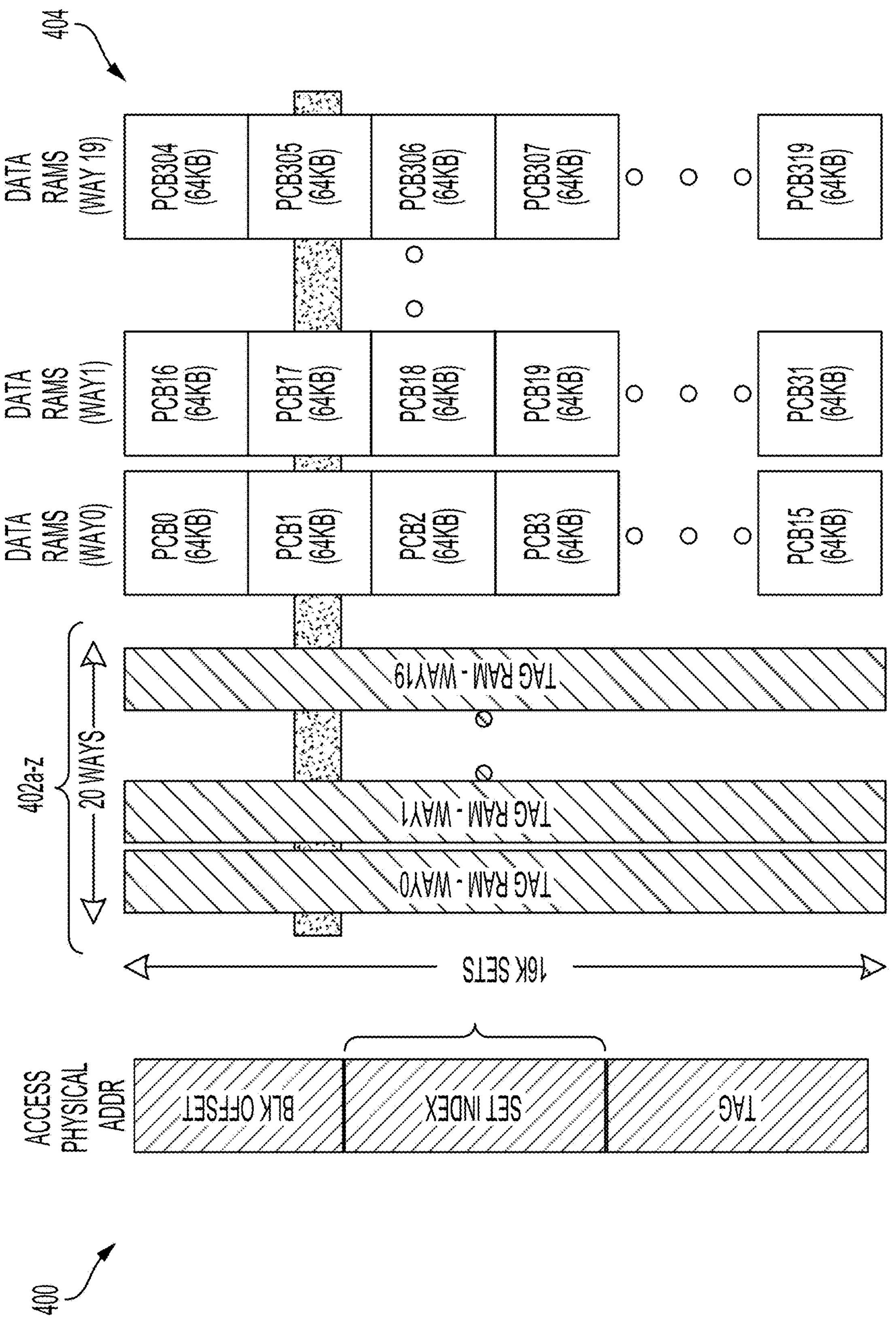
FIG. 4 is a block diagram illustrating an example memory layout of cache memories, in accordance with various aspects of the present disclosure.

FIG. 4 is a block diagram illustrating an example memory layout 400 of cache memories, in accordance with various aspects of the present disclosure. The example memory layout 400 of cache memories (e.g., 308*a*, 308*b*) may include a set of Tag RAM 402*a-z* and corresponding data RAM memory 404. For instance, as shown in FIG. 4, the cache memories (e.g., 308*a*) may include 20 ways, each of which includes a Tag RAM. Each way may refer to a mapping between blocks of main memory and cache memory (e.g., cache lines). A Tag RAM may be a type of SRAM that stores the addresses of data stored in cache. That is, each Tag RAM may hold the address (also referred to as a tag) of the data stored in the cache lines (e.g., data RAM memory 404).

A cache controller (e.g., MC 316) may use the Tag RAM to determine if data requested by a processor (e.g., CPU 102) is stored in cache. If the data is stored in cache, the access may be considered a cache hit. When the data is not stored in the cache, the attempted access may be deemed a cache miss, and data may then be fetched from main memory (e.g., DRAM 320).

The data RAM 404, like the set of Tag RAM 402*a-z*, may be divided into a number of ways (e.g., 20 ways). In addition, each way of the data RAM 404 may be partitioned into a set of power collapsible blocks (PCBs). A PCB may comprise a group that can be collapsed together. Each PCB may, for instance, have a size of 64 KB. The group may include two SRAMs (e.g., 32 KB each).

In accordance with aspects of the present disclosure, access activity may be tracked for each PCB. Then, when a PCB (404) is determined to be inactive, the PCB may be placed into a sleep retention state. On the other hand, the PCB (404) may wake up in response to a hardware access to the PCB in the sleep retention state.

Figure 5:
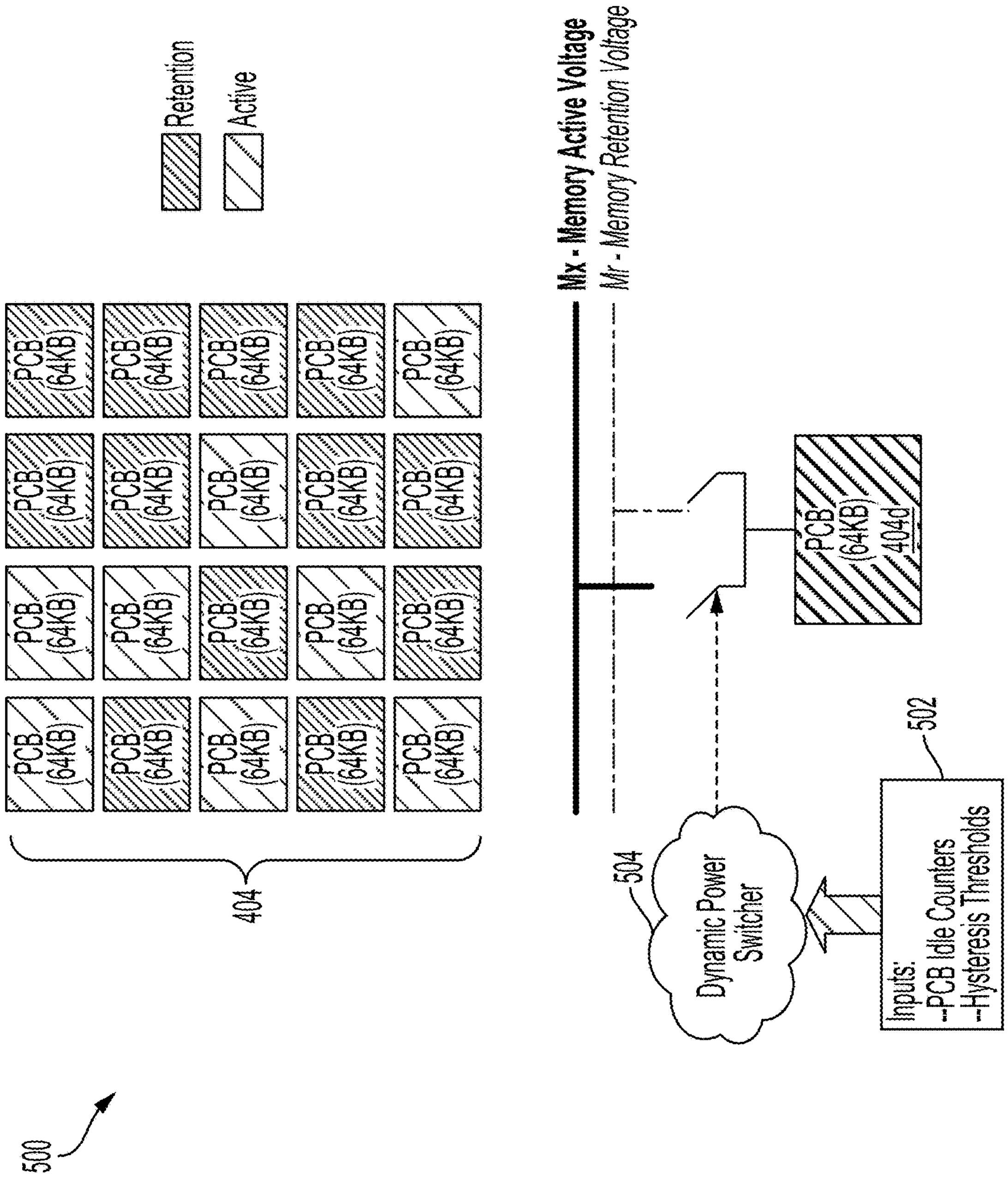
FIG. 5 is a block diagram illustrating an example implementation of activity-based data random access memory (RAM) retention, in accordance with various aspects of the present disclosure.

FIG. 5 is a block diagram illustrating an example implementation 500 of activity-based data RAM retention, in accordance with various aspects of the present disclosure. Referring to FIG. 5, a set of PCBs of the data RAM 404 are shown.

The activity of each PCB may be tracked. Based on the activity, the PCB may be determined to be active. On the other hand, when the PCB is determined to be inactive, the PCB may be selectively retention-collapsed. Retention-collapsed refers to putting the SRAM of the PCB (e.g., 404*d*) into the sleep state by collapsing a peripheral circuit voltage (e.g., memory active voltage (Mx)) and not collapsing a bit cell core voltage (e.g., memory retention voltage (Mr)).

The power state transitions may be managed by a finite state machine (FSM). In some aspects, the transitions may be managed using an FSM for each PCB. An activity counter may count an inactivity period for each PCB. For example, when an access is reissued or stalled in an inflight buffer, a target PCB may be considered to be in an inactive state.

Inflight buffers may aid in management of data being transferred between processors (e.g., CPU 102 or GPU 104 of FIG. 3) and main memory (e.g., 320) or cache memory (e.g., PCB 404*d*). Inflight buffers may increase efficiency in the flow of data and reduce processing latency. Inflight buffers may, for example, include read buffers or write buffers. Read buffers may hold data that has been fetched from main memory (e.g., 320) that has not yet been processed by a processor (e.g., CPU 102 or GPU 104). Write buffers may hold data that is being written to memory (e.g., PCB 404*d* or 320). Write buffers may enable the processor (e.g., CPU 102 or GPU 104) to proceed with other tasks without waiting for the write operation to complete.

Accordingly, data held in an inflight buffer that is directed to/from cache memory (e.g., PCB 404*d*) may indicate activity/use of the cache memory.

The inactivity of the PCB may trigger an activity counter (e.g., an idle counter) to begin counting clock cycles of inactivity. The activity counter may be supplied to a RAM sleep controller 502. In various aspects, the RAM sleep controller 502 may comprises a separate hardware component/module/logic or may be a separate hardware component/module/logic included within the MC 316. The RAM sleep controller 502 that monitors the traffic to the memory (e.g., 404 and 312) and maintains the status (e.g., active/sleep) of the PCBs (404).

Each of the PCBs (e.g., 404*d*) may be coupled to a power source by a dynamic power switcher 504 controlled by the RAM sleep controller 502. When the PCB (e.g., 404*d*) is determined to be active, the RAM sleep controller 502 may control the dynamic power switcher 504 to couple the PCB (e.g., 404*d*) to a memory active power voltage source (Mx). Conversely, when the PCB (e.g., 404*d*) is determined to be inactive (e.g., idle counter>hysteresis threshold), the RAM sleep controller 502 may control the dynamic power switcher 504 to decouple the PCB (e.g., 404*d*) from the memory active power voltage source (Mx). The hysteresis threshold may, for instance, comprise a programmable time limit (e.g., clock cycles) for which the RAM sleep controller 502 waits to declare inactivity for a PCB. The RAM sleep controller 502 may control the dynamic power switcher 504 to transition the PCB (e.g., 404*d*) to a sleep retention state receiving power by coupling the PCB to the memory retention voltage source (Mr).

In some aspects, a customized sleep mode (e.g., light sleep mode) may be employed to provide faster wakeup time for additional leakage savings. That is, some conventional SRAM may take a number of cycles to perform the wake up (e.g., 20 nanoseconds (ns)+dummy cycles (e.g., clock cycles in which no data is written)).

When the customized sleep mode is employed, the SRAM may wake up faster (e.g., 10 ns+dummy cycles).

Figure 6:
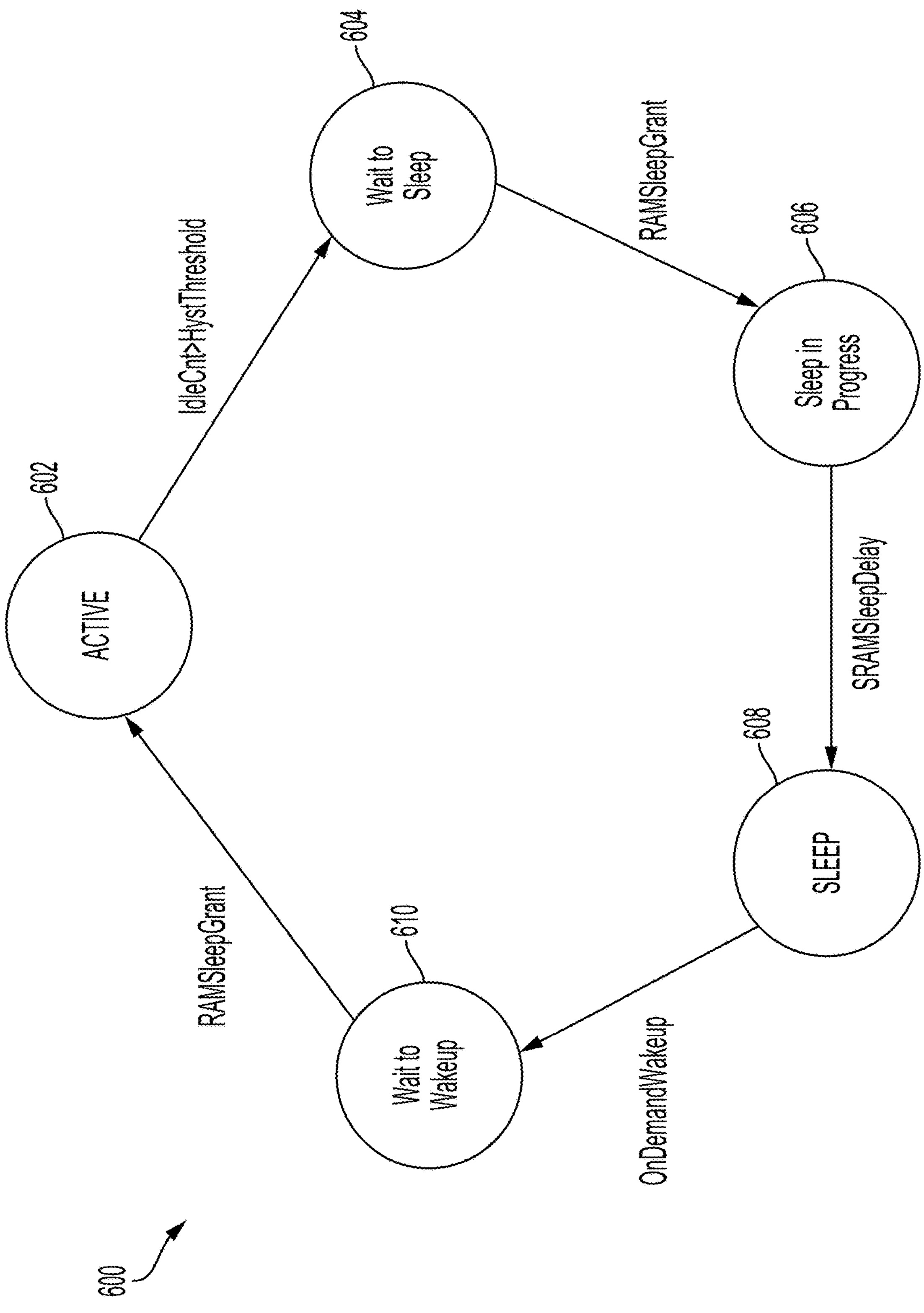
FIG. 6 is a block diagram illustrating an example power state finite state machine (FSM), in accordance with various aspects of the present disclosure.

FIG. 6 is a block diagram illustrating an example power state finite state machine (FSM) 600, in accordance with various aspects of the present disclosure. In a first stage 602, a PCB may be in an active state. For instance, at power on, a PCB may be initialized and placed in the active state. As the memory traffic starts, the inflight counter of the PCB may be incremented. The inflight counter is the number of inflight accesses (e.g., an attempt to read data from or write data to the cache) or fills (e.g., loading data into the cache from main memory) for the PCB. If the inflight counter becomes zero, e.g., no access or fill for the particular PCB, an idle counter may trigger to start counting a number of idle cycles.

When the idle counter exceeds a threshold (e.g., hysteresis threshold), at a second stage 604, the FSM 600 may enter a wait to sleep state. A request may be sent for the RAM corresponding to the PCB to enter the sleep retention state. The request to enter the sleep retention state may be sent to a RAM sleep controller (e.g., 502).

If the sleep retention request is granted, the cache controller (e.g., MC 316) may respond by sending a RAM sleep grant to initiate sleep. In turn, at a third stage 606, the FSM 600 may enter a sleep in progress state. An SRAM sleep delay sequence may be sent to put the SRAM to sleep. At a fourth stage 608, the FSM 600 may enter a sleep state. That is, the dynamic switcher may be triggered to open a switch decoupling the PCB from the memory active voltage (Mx).

The PCB may wake on demand. When there is an access directed to the PCB, a wakeup request may be triggered. At a fifth stage 610, the FSM 600 may enter a wait to wakeup state. A wake up request may be sent to the RAM sleep controller (e.g., 502). The RAM sleep controller (e.g., 502) may initiate the SRAM (e.g., SRAM of a PCB 404) to start a wakeup cycle. When the wakeup is complete, the RAM controller may send a Wakeup grant. Then, the FSM 600 may return to the active state (at the first stage 602).

In some aspects, an occupancy counter may also be employed to determine when a PCB may be placed in the idle state. The occupancy counter may track the number of valid lines in a PCB. In some examples, the occupancy counter and the idle counter may be aggregated and compared to the threshold. If the aggregate exceeds the threshold, then FSM for the PCB may transition from the active state (602) to the wait to sleep state (604).

Additionally, further enhancement may be realized using separate wakeup priorities for reduce the wakeup latency. For example, separate wakeup first in first out queues (FIFOs) may be used for fills, reads, and writes. In some aspects, multiple PCBs (404) may be awakened at the same time. For instance, the PCBs (e.g., 404) may be wakeup by different types of requests to the cache such as reads, write, cache evictions and/or line fills (e.g., fetch from the main memory 312). Each type of transaction may have a separate queue (FIFO) and each queue may have a fixed grant priority in case of multiple wake-up requests from different request types.

Accordingly, aspects of the present disclosure may beneficially reduce, and in some aspects, significantly reduce the data RAM leakage power.

Figure 7:
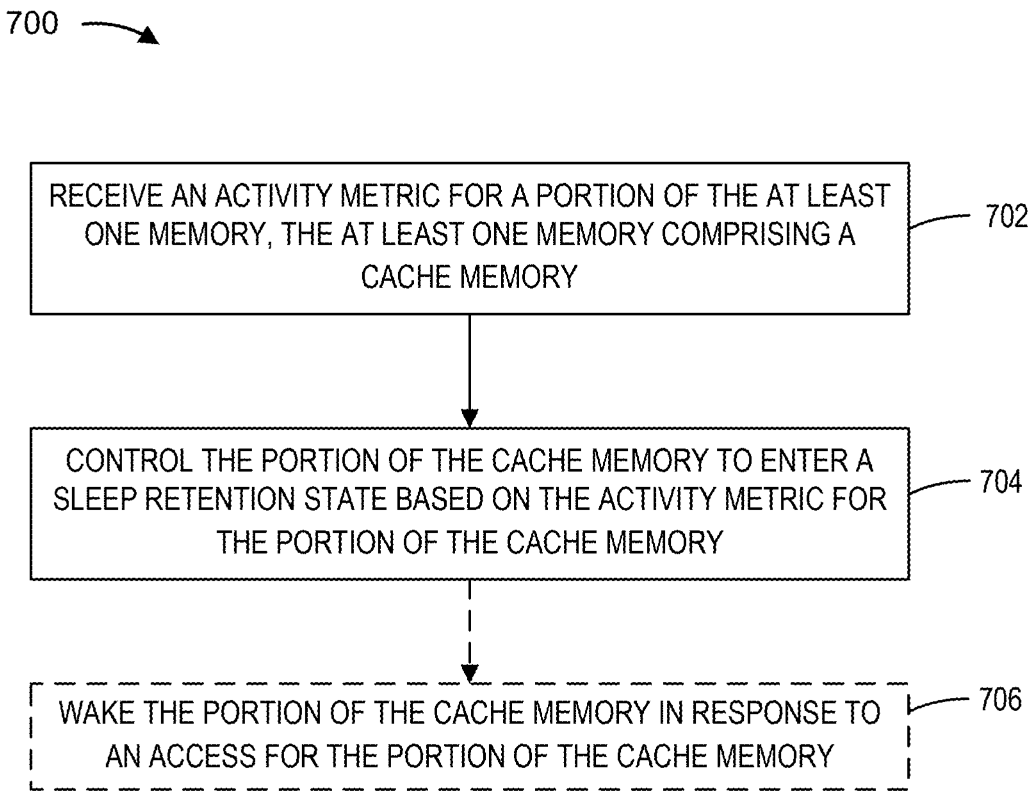
FIG. 7 is a flow diagram illustrating an example process performed, for example, by a processor, in accordance with various aspects of the present disclosure.

FIG. 7 is a flow diagram illustrating an example process 700 performed, for example, by a processor, in accordance with various aspects of the present disclosure. The process 700 is an example of activity-based data retention. The process 700 may be performed by a processor, such as the RAM sleep controller 502, for example.

As shown in FIG. 7, at block 702, the processor receives an activity metric for a portion of at least one memory. The at least one memory includes a cache memory. For example, as described with reference to FIG. 5, the activity of each PCB (e.g., 404) of cache memory (e.g., 308*a*, 308*b*) may be tracked. Based on the activity, the PCB (e.g., 404) may be determined to be active. A PCB (e.g., 404) may comprise a group of SRAM that may be collapsed together. Each PCB (e.g., 404) may, for instance, have a size of 64 KB. The group may include two SRAMs (e.g., 32 KB each). The inactivity of the PCB may trigger an activity counter (e.g., an idle counter) to begin counting clock cycles of inactivity. The activity counter may be supplied to a RAM sleep controller 502. In various aspects, the RAM sleep controller 502 may comprises a separate hardware component/module/logic or may be a separate hardware component/module/logic included within the MC 316. The RAM sleep controller 502 that monitors the traffic to the memory (e.g., 404 and 312) and maintains the status (e.g., active/sleep) of the PCBs (404).

At block 704, the processor control the portion of the cache memory to enter a sleep retention state based on the activity metric for the portion of the cache memory. For example, as described with reference to FIG. 5, when the PCB (e.g., 404*d*) is determined to be inactive (e.g., idle counter>hysteresis threshold), the RAM sleep controller 502 may control the dynamic power switcher 504 to decouple the PCB (e.g., 404*d*) from the memory active power voltage source (Mx). The hysteresis threshold may, for instance, comprise a programmable time limit (e.g., clock cycles) for which the RAM sleep controller 502 waits to declare inactivity for a PCB. The RAM sleep controller 502 may control the dynamic power switcher 504 to transition the PCB (e.g., 404*d*) to a sleep retention state receiving power by coupling the PCB to the memory retention voltage source (Mr).

At block 706, the processor may optionally wake the portion of the cache memory in response to an access for the portion of the cache memory. As described, for example, with reference to FIG. 6, the PCB may wake on demand. When there is an access directed to the PCB, a wakeup request may be triggered. At a fifth stage 610, the FSM 600 may enter a wait to wakeup state. A wake up request may be sent to the RAM sleep controller (e.g., 502). The RAM sleep controller (e.g., 502) may initiate the SRAM (e.g., SRAM of a PCB 404) to start a wakeup cycle.

Figure 8:
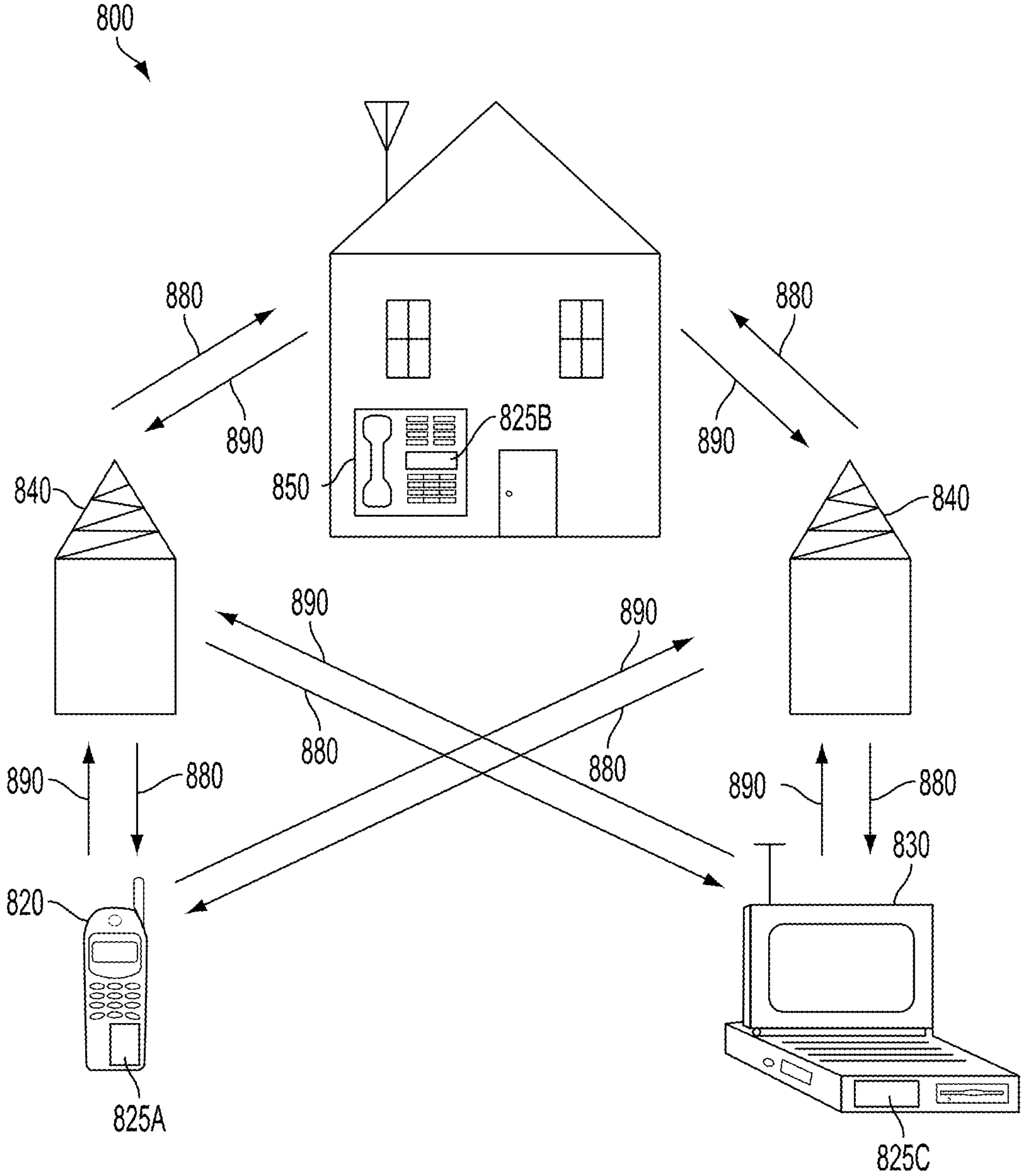
FIG. 8 is a block diagram showing an exemplary wireless communications system in which a configuration of the present disclosure may be advantageously employed.

FIG. 8 is a block diagram showing an exemplary wireless communications system 800, in which an aspect of the present disclosure may be advantageously employed. For purposes of illustration, FIG. 8 shows three remote units 820, 830, and 850, and two base stations 840. It will be recognized that wireless communications systems may have many more remote units and base stations. Remote units 820, 830, and 850 include integrated circuit (IC) devices 825A, 825B, and 825C that include the disclosed activity-based retention system. It will be recognized that other devices may also include the disclosed bus traffic reduction system such as the base stations, switching devices, and network equipment. FIG. 8 shows forward link signals 880 from the base stations 840 to the remote units 820, 830, and 850, and reverse link signals 890 from the remote units 820, 830, and 850 to the base stations 840.

In FIG. 8, remote unit 820 is shown as a mobile telephone, remote unit 830 is shown as a portable computer, and remote unit 850 is shown as a fixed location remote unit in a wireless local loop system. For example, the remote units may be a mobile phone, a hand-held personal communication systems (PCS) unit, a portable data unit, such as a personal data assistant, extended reality system, an augmented reality system, a GPS enabled device, a navigation device, a set top box, a music player, a video player, an entertainment unit, a fixed location data unit, such as meter reading equipment, or other device that stores or retrieves data or computer instructions, or combinations thereof. Although FIG. 8 illustrates remote units according to the aspects of the present disclosure, the disclosure is not limited to these exemplary illustrated units. Aspects of the present disclosure may be suitably employed in many devices, which include the disclosed bus traffic reduction system.

Figure 9:
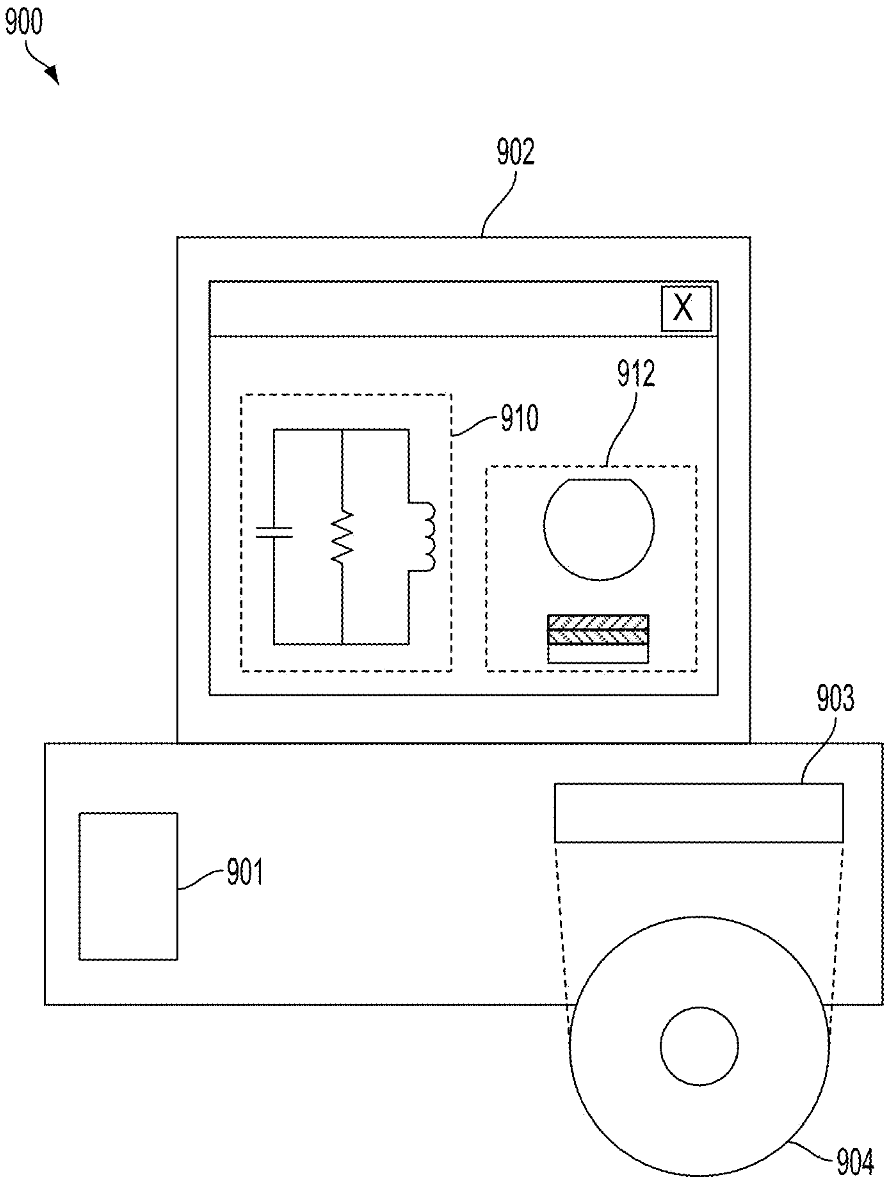
FIG. 9 is a block diagram illustrating a design workstation used for circuit, layout, and logic design of components, in accordance with various aspects of the present disclosure.

FIG. 9 is a block diagram illustrating a design workstation 900 used for circuit, layout, and logic design of a semiconductor component, such as the RAM sleep controller 502 disclosed above. The design workstation 900 includes a hard disk 901 containing operating system software, support files, and design software such as Cadence or OrCAD. The design workstation 900 also includes a display 902 to facilitate design of a circuit 910 or a semiconductor component 912, such as the RAM sleep controller 502. A storage medium 904 is provided for tangibly storing the design of the circuit 910 or the semiconductor component 912 (e.g., RAM sleep controller 502). The design of the circuit 910 or the semiconductor component 912 RAM sleep controller 502) may be stored on the storage medium 904 in a file format such as GDSII or GERBER. The storage medium 904 may be a CD-ROM, DVD, hard disk, flash memory, or other appropriate device. Furthermore, the design workstation 900 includes a drive apparatus 903 for accepting input from or writing output to the storage medium 904.

Data recorded on the storage medium 904 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 904 facilitates the design of the circuit 910 or the semiconductor component 912 by decreasing the number of processes for designing semiconductor wafers.

Example Aspects

Aspect 1: An apparatus, comprising: at least one memory; and hardware logic coupled to the at least one memory, the hardware logic configured to: receive an activity metric for a portion of the at least one memory, the at least one memory comprising a cache memory; and control the portion of the cache memory to enter a sleep retention state based on the activity metric for the portion of the cache memory.

Aspect 2: The apparatus of Aspect 1, in which the activity metric comprises an idle counter and the hardware logic is further configured to control the portion of the cache memory to enter the sleep retention state, responsive to the idle counter being greater than a predefined threshold.

Aspect 3: The apparatus of Aspect 1 or 2, in which the cache memory is partitioned into multiple power collapsible blocks (PCBs).

Aspect 4: The apparatus of any preceding Aspect, in which each PCB of the multiple PCBs is coupled to a switch and the hardware logic is further configured to control the switch for each PCB to couple to the PCB to at least one of a first power source or a second power source based on the idle counter.

Aspect 5: The apparatus of any preceding Aspect, in which the hardware logic is configured to transition a first PCB of the multiple PCBs to the sleep retention state by controlling the switch for the first PCB to couple to the first power source when the idle counter is greater that threshold.

Aspect 6: The apparatus of any preceding Aspect, in which the idle counter is triggered to start counting idle periods in response to a number of accesses for the portion of the cache memory being equal to zero.

Aspect 7: The apparatus of any preceding Aspect, in which the hardware logic is further configured to wake the portion of the cache memory in response to an access for the portion of the cache memory.

Aspect 8: A processor-implemented method comprising: receiving an activity metric for a portion of at least one memory, the at least one memory comprising a cache memory; and controlling the portion of the cache memory to enter a sleep retention state based on the activity metric for the portion of the cache memory.

Aspect 9: The processor-implemented method of Aspect 8, in which the activity metric comprises an idle counter and the processor implemented method further comprises controlling the portion of the cache memory to enter the sleep retention state, responsive to the idle counter being greater than a predefined threshold.

Aspect 10: The processor-implemented method of Aspect 8 or 9, in which the cache memory is partitioned into multiple power collapsible blocks (PCBs).

Aspect 11: The processor-implemented method of any of Aspects 8-10, in which each PCB of the multiple PCBs is coupled to a switch and the processor implemented method further comprises controlling the switch for each PCB to couple to the PCB to at least one of a first power source or a second power source based on the idle counter.

Aspect 12: The processor-implemented method of any of Aspects 8-11, further comprising transitioning a first PCB of the multiple PCBs to the sleep retention state by controlling the switch for the first PCB to couple to the first power source when the idle counter is greater that threshold.

Aspect 13: The processor-implemented method of any of Aspects 9-12, further comprising triggering the idle counter to start counting idle periods in response to a number of accesses for the portion of the cache memory being equal to zero.

Aspect 14: The processor-implemented method of any of Aspects 8-13, further comprising waking the portion of the cache memory in response to an access for the portion of the cache memory.

Aspect 15: An apparatus, comprising: means for receiving an activity metric for a portion of at least one memory, the at least one memory comprising a cache memory; and means for controlling the portion of the cache memory to enter a sleep retention state based on the activity metric for the portion of the cache memory.

Aspect 16: The apparatus of Aspect 15, in which the activity metric comprises an idle counter and the apparatus further comprises means for controlling the portion of the cache memory to enter the sleep retention state, responsive to the idle counter being greater than a predefined threshold.

Aspect 17: The apparatus of Aspect 15 or 16, in which the cache memory is partitioned into multiple power collapsible blocks (PCBs).

Aspect 18: The apparatus of any of Aspects 15-17, in which each PCB of the multiple PCBs is coupled to a switch and the processor implemented method further comprises controlling the switch for each PCB to couple to the PCB to at least one of a first power source or a second power source based on the idle counter.

Aspect 19: The apparatus of Aspects 15-18, further comprising transitioning a first PCB of the multiple PCBs to the sleep retention state by controlling the switch for the first PCB to couple to the first power source when the idle counter is greater that threshold.

Aspect 20: The apparatus of Aspects 15-19, further comprising means for waking the portion of the cache memory in response to an access for the portion of the cache memory.

In one aspect, the receiving means and/or controlling means may be the RAM sleep controller 502 and/or MC 316 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

For a firmware and/or software implementation, the methodologies may be implemented with modules (e.g., procedures, functions, and so on) that perform the functions described. A machine-readable medium tangibly embodying instructions may be used in implementing the methodologies described. For example, software codes may be stored in a memory and executed by a processor unit. Memory may be implemented within the processor unit or external to the processor unit. As used, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above, and below may refer to sides of a substrate or electronic device.

Moreover, the scope of the present disclosure is not intended to be limited to the particular configurations of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the present disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in RAM, flash memory, ROM, erasable programmable read-only memory (EPROM), EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the present disclosure is provided to enable any person skilled in the art to make or use the present disclosure. Various modifications to the disclosure will be readily apparent to those skilled in the art, and the generic principles defined may be applied to other variations without departing from the spirit or scope of the disclosure. Thus, the present disclosure is not intended to be limited to the examples and designs described, but is to be accorded the widest scope consistent with the principles and novel features disclosed.

What is claimed is:

1. An apparatus, comprising:

at least one memory; and hardware logic coupled to the at least one memory, the hardware logic configured to:

receive an activity metric comprising an idle counter for a portion of the at least one memory, the at least one memory comprising a cache memory partitioned into multiple power collapsible blocks (PCBs), each PCB of the multiple PCBs is coupled to a switch;

control the switch for each PCB to couple to the PCB to at least one of a first power source or a second power source based on the idle counter;

control the portion of the cache memory to enter a sleep retention state, responsive to the idle counter being greater than a predefined threshold; and prioritize portions of the cache memory to awaken in response to multiple portions awakening at a same time, priorities being based on separate wakeup queues, corresponding to different transaction types.

2. The apparatus of claim 1, in which the hardware logic is configured to transition a first PCB of the multiple PCBs to the sleep retention state by controlling the switch for the first PCB to couple to the first power source when the idle counter is greater than the predefined threshold.

3. The apparatus of claim 1, in which the idle counter is triggered to start counting idle periods in response to a number of accesses for the portion of the cache memory being equal to zero.

4. The apparatus of claim 1, in which the hardware logic is further configured to wake the portion of the cache memory in response to an access for the portion of the cache memory.

5. An apparatus, comprising:

means for receiving an activity metric comprising an idle counter for a portion of at least one memory, the at least one memory comprising a cache memory partitioned into multiple power collapsible blocks (PCBs), each PCB of the multiple PCBs is coupled to a switch;

means for controlling the switch for each PCB to couple to the PCB to at least one of a first power source or a second power source based on the idle counter;

means for controlling the portion of the cache memory to enter a sleep retention state, responsive to the idle counter being greater than a predefined threshold; and means for prioritizing portions of the cache memory to awaken in response to multiple portions awakening at a same time, priorities being based on separate wakeup queues corresponding to different transaction types.

6. The apparatus of claim 5, further comprising means for transitioning a first PCB of the multiple PCBs to the sleep retention state by controlling the switch for the first PCB to couple to the first power source when the idle counter is greater than the predefined threshold.

7. The apparatus of claim 5, further comprising means for waking the portion of the cache memory in response to an access for the portion of the cache memory.

8. A processor-implemented method comprising:

receiving an activity metric comprising an idle counter for a portion of at least one memory, the at least one memory comprising a cache memory partitioned into multiple power collapsible blocks (PCBs), each PCB of the multiple PCBs is coupled to a switch;

controlling the switch for each PCB to couple to the PCB to at least one of a first power source or a second power source based on the idle counter;

controlling the portion of the cache memory to enter a sleep retention state, responsive to the idle counter being greater than a predefined threshold; and prioritizing portions of the cache memory to awaken in response to multiple portions awakening at a same time, priorities being based on separate wakeup queues corresponding to different transaction types.

9. The processor-implemented method of claim 8, further comprising transitioning a first PCB of the multiple PCBs to the sleep retention state by controlling the switch for the first PCB to couple to the first power source when the idle counter is greater than the predefined threshold.

10. The processor-implemented method of claim 8, further comprising triggering the idle counter to start counting idle periods in response to a number of accesses for the portion of the cache memory being equal to zero.

11. The processor-implemented method of claim 8, further comprising waking the portion of the cache memory in response to an access for the portion of the cache memory.

* * * * *